US012676495B2

(12) United States Patent
Nasr Azadani et al.

(10) Patent No.: US 12,676,495 B2
(45) Date of Patent: Jul. 7, 2026

(54) HYBRID ENERGY STORAGE BACKUP FOR DATACENTER

(71) Applicant: Microsoft Technology Licensing, LLC, Redmond, WA (US)

(72) Inventors: Ehsan Nasr Azadani, Sammamish, WA (US); Christian L. Belady, Mercer Island, WA (US); Sean Michael James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 18/311,119

(22) Filed: May 2, 2023

(65) Prior Publication Data

US 2024/0372389 A1      Nov. 7, 2024

(51) Int. Cl.
*H02J 7/92* (2026.01)
*G05B 19/042* (2006.01)
(Continued)

(52) U.S. Cl.
CPC .............. *H02J 7/92* (2026.01); *G05B 19/042* (2013.01); *H02J 7/50* (2026.01); *H02J 7/855* (2026.01);
(Continued)

(58) Field of Classification Search
CPC .... H02J 13/00002; H02J 2310/10; H02J 3/32; H02J 7/0013; H02J 7/0063; H02J 7/0071;
(Continued)

(56) References Cited

U.S. PATENT DOCUMENTS

| 10,103,569 B2 | 10/2018 | Li |
| 11,188,142 B1 * | 11/2021 | BeSerra ................ G06F 1/3206 |

(Continued)

FOREIGN PATENT DOCUMENTS

| CN | 108898282 A * | 11/2018 |
| EP | 4060851 A1 | 9/2022 |
| KR | 20210016795 A | 2/2021 |

OTHER PUBLICATIONS

International Search Report and Written Opinion received for PCT Application No. PCT/US2024/026128, Sep. 4, 2024, 13 pages.
(Continued)

*Primary Examiner* — Kidest Worku
(74) *Attorney, Agent, or Firm* — Ray Quinney & Nebeker P.C.; John O. Carpenter

(57) ABSTRACT

A system may include a first energy storage system (ESS) configured to provide electrical power to a datacenter. A system may include a second ESS configured to provide electrical power to the datacenter, wherein the second ESS is a higher-level ESS relative to the first ESS. A system may include a hierarchical ESS controller in data communication with the first ESS, the second ESS, and the datacenter and configured to: obtain grid information from a regional power grid, obtain first ESS state information, obtain second ESS state information, obtain datacenter power demands, determine a discharge schedule of the first ESS and the second ESS for the datacenter based at least partially on the grid information and the datacenter power demands, and discharge at least one of the first ESS and the second ESS based on the discharge schedule.

19 Claims, 7 Drawing Sheets

(51) Int. Cl.
    *H02J 7/00*        (2006.01)
    *H02J 7/50*        (2026.01)
    *H02J 13/12*      (2026.01)

(52) U.S. Cl.
    CPC ...... *H02J 13/12* (2026.01); *G05B 2219/2639*
                                     (2013.01)

(58) Field of Classification Search
    CPC .. H02J 9/04; G05B 2219/2639; G05B 19/042
    See application file for complete search history.

(56)                  References Cited

U.S. PATENT DOCUMENTS

| | | | |
|---|---|---|---|
| 11,239,665 B2 | 2/2022 | Navarro | |
| 11,605,970 B2 | 3/2023 | Chen | |
| 2002/0145404 A1* | 10/2002 | Dasgupta | B60L 15/20 |
| | | | 320/116 |
| 2009/0235097 A1* | 9/2009 | Hamilton | G06F 1/3203 |
| | | | 713/320 |
| 2011/0101779 A1 | 5/2011 | Patel | |
| 2011/0204854 A1* | 8/2011 | King | H02J 7/34 |
| | | | 320/163 |
| 2013/0111494 A1* | 5/2013 | Hyser | G06F 9/5094 |
| | | | 718/105 |
| 2013/0117592 A1* | 5/2013 | Humphrey | G06F 1/3203 |
| | | | 713/320 |
| 2015/0171666 A1* | 6/2015 | Yeon | H02J 9/061 |
| | | | 700/297 |
| 2015/0221993 A1* | 8/2015 | Wang | H01M 10/425 |
| | | | 429/90 |
| 2018/0026316 A1* | 1/2018 | Teng | H02J 7/0019 |
| | | | 320/134 |
| 2018/0285767 A1 | 10/2018 | Chew | |
| 2019/0089023 A1* | 3/2019 | Sastry | H01M 50/269 |
| 2019/0258307 A1* | 8/2019 | Shaikh | G06F 1/3206 |
| 2020/0274367 A1 | 8/2020 | Navarro | |
| 2021/0004035 A1* | 1/2021 | Yang | H02J 3/14 |
| 2022/0077707 A1* | 3/2022 | Yan | H02J 7/0048 |
| 2022/0102998 A1* | 3/2022 | Xu | H02J 7/0071 |
| 2022/0109315 A1* | 4/2022 | Jeong | H02J 7/0014 |
| 2022/0352528 A1 | 11/2022 | Jaramillo | |
| 2022/0416545 A1* | 12/2022 | Diamond | G05B 15/02 |
| 2024/0332971 A1 | 10/2024 | Nasr Azadani | |

OTHER PUBLICATIONS

Non-Final Office Action mailed on Oct. 16, 2025, in U.S. Appl. No. 18/203,491, 22 pages.

International Preliminary Report On Patentability received for PCT Application No. PCT/US2024/019474, mailed on Oct. 9, 2025, 08 pages.

International Search Report and Written Opinion received for PCT Application No. PCT/US2024/019474, Aug. 6, 2024, 13 pages.

International Preliminary Report on Patentability received for PCT Application No. PCT/US2024/026128, mailed on Nov. 13, 2025, 08 pages.

\* cited by examiner

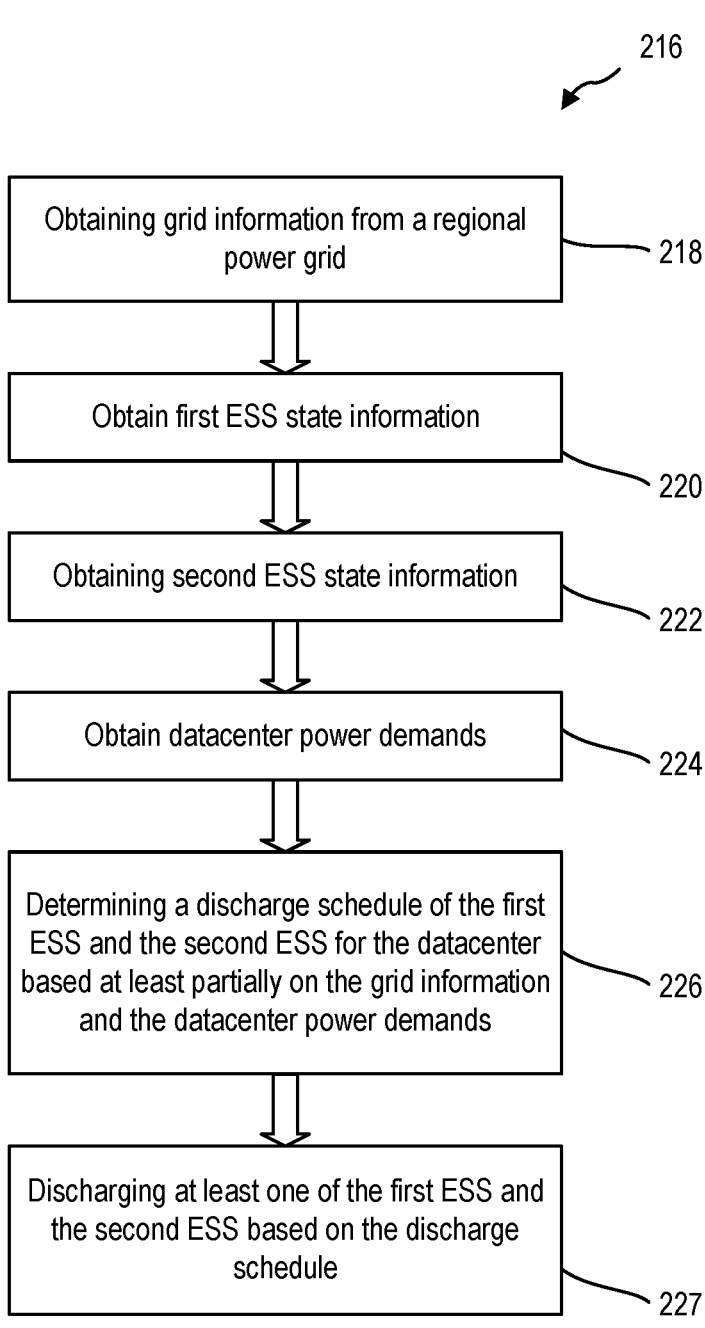

216

Obtaining grid information from a regional power grid — 218

Obtain first ESS state information — 220

Obtaining second ESS state information — 222

Obtain datacenter power demands — 224

Determining a discharge schedule of the first ESS and the second ESS for the datacenter based at least partially on the grid information and the datacenter power demands — 226

Discharging at least one of the first ESS and the second ESS based on the discharge schedule — 227

FIG. 2

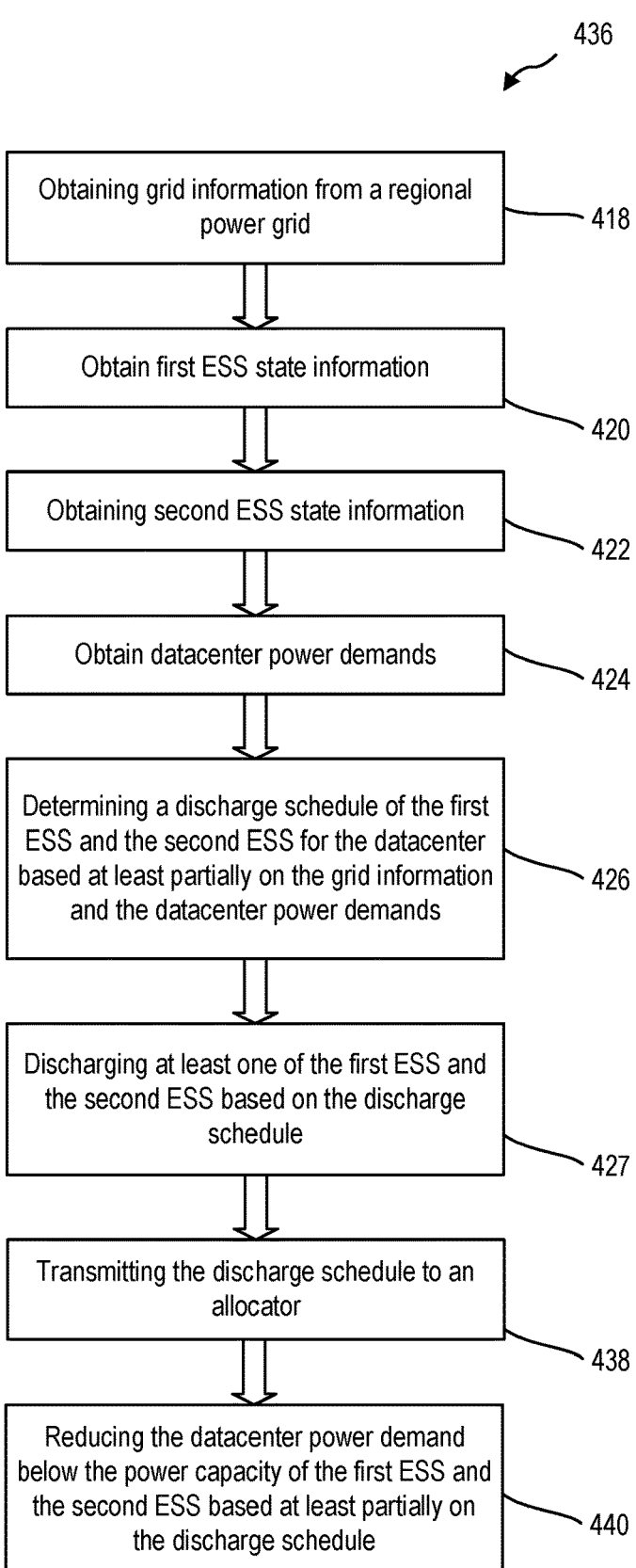

436

Obtaining grid information from a regional power grid —418

Obtain first ESS state information —420

Obtaining second ESS state information —422

Obtain datacenter power demands —424

Determining a discharge schedule of the first ESS and the second ESS for the datacenter based at least partially on the grid information and the datacenter power demands —426

Discharging at least one of the first ESS and the second ESS based on the discharge schedule —427

Transmitting the discharge schedule to an allocator —438

Reducing the datacenter power demand below the power capacity of the first ESS and the second ESS based at least partially on the discharge schedule —440

FIG. 4

HYBRID ENERGY STORAGE BACKUP FOR DATACENTER

BACKGROUND

Datacenters require a robust backup system for electrical power to ensure reliable uptimes. Different backup systems are more efficient at different energy storage durations, and different backup systems have different start times that can cause delays in the response of the backup system.

BRIEF SUMMARY

In some embodiments, the techniques described herein relate to a system for providing power to a datacenter including: a first energy storage system (ESS) configured to provide electrical power to a datacenter; a second ESS configured to provide electrical power to the datacenter, wherein the second ESS is a higher-level ESS relative to the first ESS; a hierarchical ESS controller in data communication with the first ESS, the second ESS, and the datacenter and configured to: obtain grid information from a regional power grid, obtain first ESS state information, obtain second ESS state information, obtain datacenter power demands, determine a discharge schedule of the first ESS and the second ESS for the datacenter based at least partially on the grid information and the datacenter power demands, and discharge at least one of the first ESS and the second ESS based on the discharge schedule.

In some embodiments, the techniques described herein relate to a method of managing power in a datacenter, the method including: obtaining grid information from a regional power grid; obtaining first ESS state information; obtaining second ESS state information; obtaining datacenter power demands of the datacenter; determining a discharge schedule of the first ESS and the second ESS for the datacenter based at least partially on the grid information and the datacenter power demands; discharging the first ESS based on the discharge schedule; and discharging the second ESS based on the discharge schedule.

In some embodiments, the techniques described herein relate to a method of managing power in a datacenter, the method including: obtaining grid information from a regional power grid; obtaining first ESS state information; obtaining second ESS state information; obtaining datacenter power demands of the datacenter; determining a discharge schedule of the first ESS and the second ESS for the datacenter based at least partially on the grid information and the datacenter power demands, wherein the grid information includes grid pricing, and the discharge schedule is based at least partially on the grid pricing; discharging the first ESS based on the discharge schedule; and discharging the second ESS based on the discharge schedule.

This Summary is provided to introduce a selection of concepts in a simplified form that are further described below in the Detailed Description. This Summary is not intended to identify key features or essential features of the claimed subject matter. Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2 is a flowchart illustrating a method of providing electricity in a datacenter, according to at least some embodiments of the present disclosure.

FIG. 4 is a flowchart illustrating another method of providing electricity in a datacenter, according to at least some embodiments of the present disclosure.

DETAILED DESCRIPTION

Figure 1:
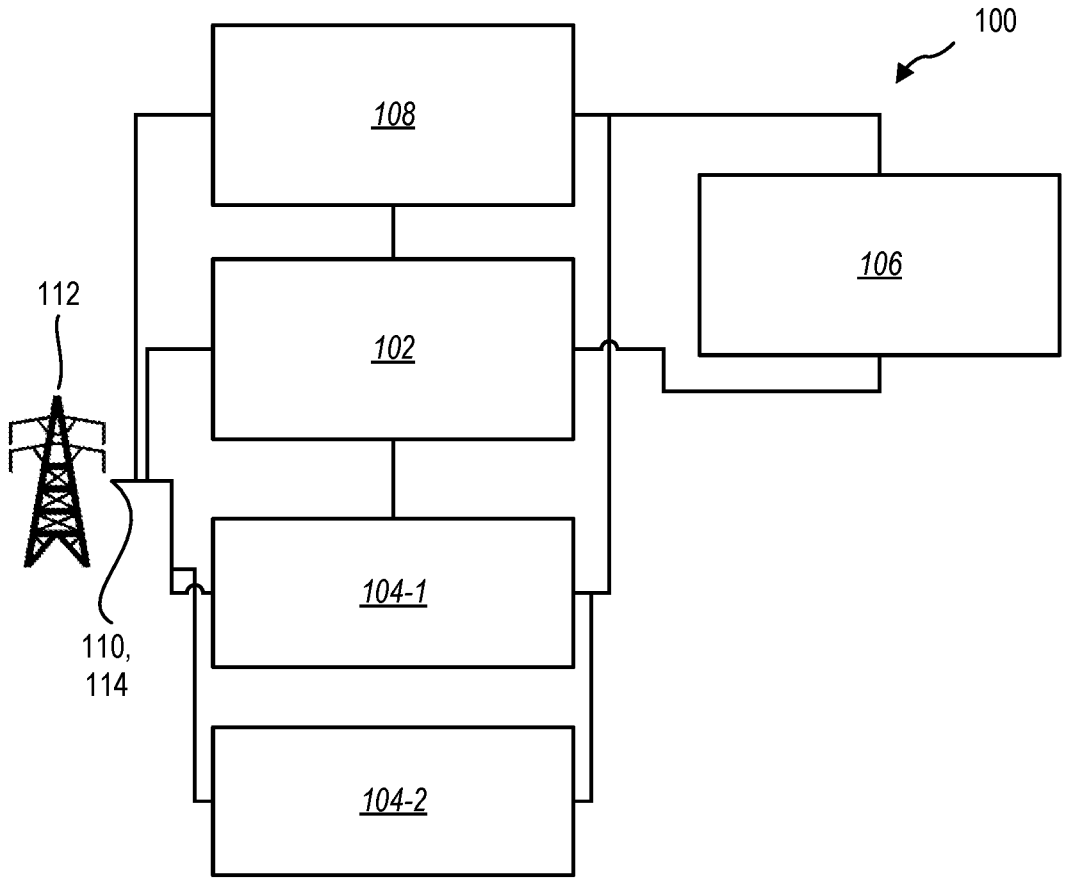
FIG. 1 is a schematic illustration of a system for managing electricity in a datacenter, according to at least some embodiments of the present disclosure.

The present disclosure generally relates to systems and methods for storing and providing electrical power to a datacenter. More particularly, the present disclosure relates to systems and methods for managing a plurality of different energy storage devices for varying durations of storage and discharge of electrical energy to a datacenter.

Various energy storage systems (ESS) have different technical characteristics including duration, cost, performance, cycling lifetime, footprint, and other considerations. The duration of the ESS is related to the duration of time the ESS can retain the stored energy. For example, some ESSs are able to store energy substantially indefinitely, such as a gravity-based ESSs (e.g., potential energy storage); some ESSs are able to store energy for short durations (e.g., minutes to hours) before the stored energy is lost or discharged, such as some rechargeable chemical battery systems, kinetic energy storage, or other ESSs; and some ESSs are able to store energy for an intermediate duration between short-duration ESSs and long-duration ESSs, such as thermal storage or other chemical battery storage.

The cost of the various ESSs may be considered as a combination of capital expense cost and operating expense cost. For example, a particular ESS may have a lower capital expense cost with an associated increase in operating expense cost. In another example, another ESS may have a higher capital expense cost, but the operating cost to store the energy for backup may be substantially zero in a static ESS, such as a gravity-based ESS.

The performance of the ESS includes properties of the ESS technology and/or the configuration of the ESS such as discharge rate, charge rate, cycling life, refueling rate and/or complexity, and other properties that limit or allow the ESS to provide electrical power to the datacenter. In some embodiments, the discharge rate is a measure of the electrical power that is output by the ESS or by a module within the ESS. For example, in some examples, an ESS may have a maximum electrical output of 1 Megawatt. In such an example, the ESS may have ten modules that are individually able to discharge at 250 Kilowatts. The ESS, therefore, may have a lesser total discharge rate than the sum of the module discharge rates.

In some embodiments, the ESS is electrically rechargeable, such as an electrical battery that is rechargeable through application of electrical current to the battery, or a mechanical ESS (e.g., potential energy or kinetic energy storage) by providing an electrical current to a motor to move a mass against gravity (e.g., pumped hydrological storage) or accelerate a mass (e.g., flywheel kinetic storage).

In some embodiments, the cycling life of an ESS or components of the ESS can affect the selection of an ESS for a datacenter. For example, some types of ESS degrade a state of health (SOH) with each cycle of a rechargeable module. In at least one example, conventional lithium-ion batteries have a lifetime of approximately 3,000-5,000 cycles. In another example, nickel cadmium batteries have a cycle life of approximately 1,000 cycles. In another example, a pumped hydro ESS may be able to cycle water into and out of a reservoir substantially indefinitely without degradation in storage capacity of the reservoir.

Cycling life, in some embodiments, includes cycle control. For example, a cycle includes recharging (or refueling) and discharging the ESS. In some examples, a cycle may be halted mid-cycle, such as after discharging a predetermined portion of the stored energy or at a predetermined state of charge (SOC) of the ESS. In some examples, discharging the ESS may include reacting a fuel to produce energy, and stopping the reaction before completion may not be possible or may be inefficient. For example, halting a reaction may include introducing an additional reactant or buffer to stop the reaction, after which, restarting the reaction may not be possible.

In some embodiments, the ESS is continuously refuellable, such as a combustion generator. In some examples, a continuously refuellable ESS is continuously refuellable by fuel being added to a fuel tank in any amount (up to the capacity of the fuel tank) at any time. In some examples, the continuously refuellable ESS may be refuellable whether the continuously refuellable ESS is operating or not. This may allow a continuously refuellable ESS to be refueled during operation and continue producing power during refueling. In other examples, a coal combustion energy source or hydrogen fuel cell may be continuously refueled with any amount of fuel at any time. A continuously refuellable module or generator of an ESS is able to operate and produce electrical power substantially continuously, including through refueling.

In some embodiments, an ESS is discretely refuellable. In such examples, a discretely refuellable ESS is refueled by removal or replacement of a consumable fuel, such as a fuel rod, plate, pellet, or other replaceable fuel element. For example, a metal-air battery produces electrical power by reacting a consumable anode with air via a conductive medium. Refueling the metal-air battery includes removing and/or replacing the anode, during which the metal-air battery does not produce electrical power. Refueling a discretely refuellable ESS is therefore associated with downtime that creates a gap and/or limit on the electrical energy produced by the discretely refuellable ESS.

In some embodiments, another consideration of an ESS used in datacenter energy production includes the fuel type, such as material or state. Solid fuels may be more energy-dense than gaseous fuels, while fluid fuels may allow for simplified delivery, storage, and/or distribution of the fuel material at a site. Additionally, health and/or safety concerns of the ESS or the fuel material may affect the ESS selection. For example, some materials may require additional safety concerns or equipment that increase associated capital and/or operating costs, such as equipment costs, structural costs, or personnel costs. In other examples, some fuel materials may be regulated or prohibited in some regions.

In at least one embodiment, a footprint of the ESS affects the selection or use of the ESS for a datacenter. For example, some types of ESS require a minimum footprint on a site, such as due to footprint for fuel storage, safety considerations, or surface area, such as solar thermal collectors.

In some embodiments of systems and methods according to the present disclosure, at least two different ESSs with different durations are used to provide short-duration storage and intermediate- or long-duration storage. For example, a short-duration storage may have greater cycling performance than a long-duration ESS, while the long-duration ESS may require an initialization time during which the short-duration ESS may provide bridging electrical power until the long-duration ESS is online.

In some embodiments, a hierarchical ESS controller is in data communication with a first ESS and a second ESS. The first ESS and the second ESS are different duration ESSs, such as a short-duration ESS and a long-duration ESS, a short-duration ESS and an intermediate-duration ESS, or an intermediate-duration ESS and a long-duration ESS respectively. The hierarchical ESS controller determines a discharge plan and/or schedule based on grid information from a regional power grid to discharge the first ESS and discharge the second ESS to provide electrical power in a substantially continuous supply to the datacenter.

FIG. 1 is a system diagram of a system for providing electrical power in a datacenter. The system 100 includes an information technology (IT) load 102 that is able to be powered by a first ESS 104-1 and a second ESS 104-2. In some embodiments, the IT load 102 includes a plurality of server computers, such as organized in a server racks and/or rows, that perform a requested workload. The workload may vary with time, where the workload can require different quantities of server computers assigned to the workload and the server computers may draw different quantities of electrical power during the workload. In some embodiments, an allocator 106 is in data communication with the IT load 102 to allocate server computers and/or virtual machines (executed by the server computers) to a requested workload.

In some embodiments, a hierarchical ESS controller 108 is in data communication with the IT load 102 and/or the allocator 106 to manage electrical power delivery to the IT load 102. In some examples, the hierarchical ESS controller 108 manages electrical power delivery from the first ESS 104-1 and the second ESS 104-2 based at least partially on the workload. In some examples, the hierarchical ESS controller 108 manages electrical power delivery to the IT load 102 based at least partially on IT telemetry. In some embodiments, the IT telemetry is obtained by the hierarchical ESS controller 108 from the IT load 102, such as from the server computers, from a rack controller, or from a row controller. In some examples, IT telemetry includes power draw, processing utilization (e.g., as a percentage of available processing resources), memory utilization (e.g., as a percentage of available memory resources), and other real-time or historical data regarding the operation of the IT load 102.

The hierarchical ESS controller 108 is in data communication with the first ESS 104-1, the second ESS 104-2, and a grid connection 110 to coordinate the delivery of electrical power to the IT load 102. In some embodiments, the grid connection 110 allows electrical communication between the system 100 and a regional power grid 112 to supply electrical power to the system 100. In the event of a failure of the regional power grid 112, in some embodiments, the hierarchical ESS controller 108 communicates with the discretely refuellable ESS 104 to discharge at least a portion of the electrical energy stored in the discretely refuellable ESS 104 to the IT load 102. In some examples, the failure of the regional power grid 112 is total, where no electrical power is provided from the regional power grid 112 to the system 100, and the hierarchical ESS controller 108 communicates with the ESS 104 to provide electrical power sufficient to fully power the IT load 102. In some examples, the failure of the regional power grid 112 is partial, where electrical power is provided from the regional power grid 112 to the system 100 but the electrical power provided is less than the power demand of the IT load 102, and the hierarchical ESS controller 108 communicates with the first ESS 104-1 and the second ESS 104-2 to provide electrical power to power the IT load 102. In the above example, the utility operating the regional power grid 112 may increase generation or reduce load to recover the imbalance between energy source and demand. In such examples, the hierarchical ESS controller 108 communicates with the first ESS 104-1 and the second ESS 104-2 to provide electrical power to the IT load 102, while the utility is recovering from the partial failure at the regional power grid 112.

In some embodiments, the hierarchical ESS controller 108 determines a discharge plan of the first ESS 104-1 and the second ESS 104-2. In some embodiments, the hierarchical ESS controller 108 determines a first discharge schedule of a first ESS 104-1 and a second discharge schedule of a second ESS 104-2 that is different from the first discharge schedule. In some embodiments, a discharge plan is determined based on IT telemetry, such as current power draw of the IT load. In some embodiments, a discharge plan is determined based at least partially on current or predicted workload. For example, the hierarchical ESS controller 108 may obtain a workload from the allocator 106 and/or from the IT load 102 to determine the power demand of the IT load 102 and/or an energy demand of the IT load 102 for the current workload. In at least one example, the current workload may require 400 MW of electrical power to meet the power demand of the IT load 102 processing the workload, and the current workload may require 500 Megawatt-hours (MWh) to meet the energy demand of the current workload until the power demand decreases. In at least one embodiment, the hierarchical ESS controller 108 communicates with the allocator 106 to migrate workload from the IT load 102 (e.g., to another IT load 102 or another datacenter) when the available energy in the discretely refuellable ESS 104 is insufficient to support the workload.

The hierarchical ESS controller 108 may be further in communication with a grid information source 114. In some embodiments, a grid information source 114 is part of the grid connection 110. In some embodiments, the grid information source 114 is accessed by the energy controller 108 by a network or other connection method. The grid information source 114 may provide the hierarchical ESS controller 108 with grid information to inform the energy controller of grid power pricing, grid power supply, grid power carbon load, and other properties of the electrical power provided by and/or available from the regional power grid 112. In some embodiments, the hierarchical ESS controller 108 determines discharge rate(s), timing, and duration for each of at least the first ESS 104-1 and the second ESS 104-2 based at least partially on the grid information.

FIG. 2 is a flowchart illustrating an embodiment of a method 216 of providing power to a datacenter, such as by a hierarchical ESS controller described in relation to FIG. 1. In some embodiments, the method 216 includes obtaining grid information from a regional power grid at 218. In some embodiments, the grid information includes grid pricing information, grid power supply information, grid carbon load information, or other types of grid information. The hierarchical ESS controller may obtain the grid information from the grid information source. In some embodiments, a grid information source is part of a grid connection. In some embodiments, the grid information source is accessed by the energy controller by a network or other connection method.

The method 216 further includes obtaining first ESS state information at 220 and obtaining second ESS state information at 222. In some embodiments, the ESS state information includes a state of charge (SOC), state of health (SOH), available energy capacity, available power capacity, start up duration, and other properties or status information of the ESS. A SOC or SOH of the ESS may be obtained from the ESS or from fuel or energy storage elements of the ESS. For example, the ESS may have a SOC or SOH for the ESS or individual fuel or energy storage elements of the ESS, such as battery cells or fuel elements. In some embodiments, the ESS state information includes a total energy capacity of the ESS and an available energy capacity, such as for a liquid fuel generator. The available energy capacity indicates the energy currently available in the ESS for discharge to the IT load, while the total energy capacity may indicate the potential for greater energy capacity if and when the ESS is refueled.

In some embodiments, the ESS is continuously refuellable, such as a combustion generator. In some examples, a continuously refuellable ESS is continuously refuellable by fuel being added to a fuel tank in any amount (up to the capacity of the fuel tank) at any time. In some examples, the continuously refuellable ESS may be refuellable whether the continuously refuellable ESS is operating or not. This may allow a continuously refuellable ESS to be refueled during operation and continue producing power during refueling. In other examples, a coal combustion energy source or hydrogen fuel cell may be continuously refueled with any amount of fuel at any time. A continuously refuellable module or generator of an ESS is able to operate and produce electrical power substantially continuously, including through refueling. The total energy capacity of a continuously refuellable ESS may allow the hierarchical ESS controller to determine whether to discharge the continuously refuellable ESS and/or when to refuel the continuously refuellable ESS.

In some embodiments, the ESS state information includes one or more of a minimum power capacity, a maximum power capacity, and an available power capacity of the ESS. For example, an ESS may have different power capacities at different SOC or SOH of the ESS or fuel elements therein.

For example, a lithium-ion battery cell has a greater power capacity at a higher SOC than at a lower SOC. The hierarchical ESS controller may require an ESS to provide a minimum power capacity to sustain the IT load. In another example, the ESS may have a maximum power capacity that is possible under certain conditions, such as for a limited period of time or under certain temperature conditions. The hierarchical ESS controller may consider the maximum power capacity of the ESS when determining a discharge plan. In some examples, an ESS has an available power capacity that, based upon a SOC, temperature, or other condition of the ESS, is less than a maximum power capacity. The hierarchical ESS controller may consider the available power capacity of the ESS when determining a discharge plan.

In some embodiments, the method 216 further includes obtaining datacenter power demands at 224. Obtaining datacenter power demands includes obtaining IT telemetry and/or workload information. For example, the IT telemetry may be obtained by the hierarchical ESS controller from a rack manager, a row manager, the allocator, or from the server computers or other equipment of the IT load. In some examples, IT telemetry includes power draw, processing utilization (e.g., as a percentage of available processing resources), memory utilization (e.g., as a percentage of available memory resources), and other real-time or historical data regarding the operation of the IT load. In some examples, obtaining the workload includes communicating with the allocator and/or the IT load. The workload includes assigned processes and/or VMs that perform requested operations.

In some embodiments, obtaining the datacenter power demands includes obtaining datacenter energy demands. For example, while the ESSs are controlled by the hierarchical ESS controller to provide electrical power to continue operations of the IT load, the hierarchical ESS controller may plan or schedule discharges from a plurality of ESSs to ensure a sufficient amount of electrical energy is available to complete the current workload.

For example, the method 216 may include obtaining a current electrical power draw of the IT load to determine the power demand that allows the IT load to continue operating at the current level. In another example, the method 216 may include measuring a trend of IT telemetry to predict a future power demand or energy demand to continue or complete the current workload.

The method 216 further includes determining a discharge schedule of the first ESS and the second ESS for the datacenter based at least partially on the grid information and the datacenter power demands at 226. In some embodiments, determining a discharge schedule includes determining a discharge time, discharge rate, and discharge duration for an ESS. In a particular example, a first ESS is a lithium-ion battery ESS and a second ESS is a metal-air battery ESS. The first ESS may be able to cycle more often and respond quickly, allowing the first discharge schedule of the first ESS to include discharging the lithium-ion batteries at a discharge rate of the datacenter power demand and for a discharge duration through the available energy capacity of the lithium-ion batteries. In such an example, the lithium-ion batteries may exhibit a decrease in power capacity as the SOC decreases. Therefore, the second discharge schedule of the second ESS may include a discharge time and discharge duration that at least partially overlaps the first discharge schedule of the first ESS.

For example, the hierarchical ESS controller, after determining the power demand and energy demand of the IT load, may compare the SOC and/or SOH of the first ESS and the second ESS to the demand(s) to determine a discharge schedule for each. In one example, the power demand of the IT load is 300 kW, and the hierarchical ESS controller determines that the first ESS is capable of providing 300 kW of electrical power for 30 minutes. In addition, the energy demand of the IT load is determined to be 200 kWh, and the hierarchical ESS controller schedules the second ESS to begin discharging (e.g., producing electrical power) after 25 minutes to partially overlap with the first discharge schedule. In some embodiments, the second ESS may have a delay between startup and being able to produce a net electrical power output, and the discharge schedule may include a startup time to allow the ESS to begin discharging at the discharge time.

The substantially continuous power can then be provided to the IT load with a total of at least 300 kW and at least 200 kWh of available energy to meet the power demand. In some examples, the first ESS has a greater power capacity, and the hierarchical ESS controller communicates with an allocator to migrate at least a portion of the workload and/or reduce the power demand of the IT load prior to the second ESS supporting the IT load alone (e.g., when the first ESS is substantially depleted).

The method 216 further includes discharging at least one of the first ESS and the second ESS based on the discharge schedule at 227. In some instances, the hierarchical ESS controller may determine a discharge plan including discharge schedules for a plurality of ESSs, and the regional power grid resumes supplying electrical power before the first ESS is depleted and/or before a second ESS begins discharging.

Figure 3:
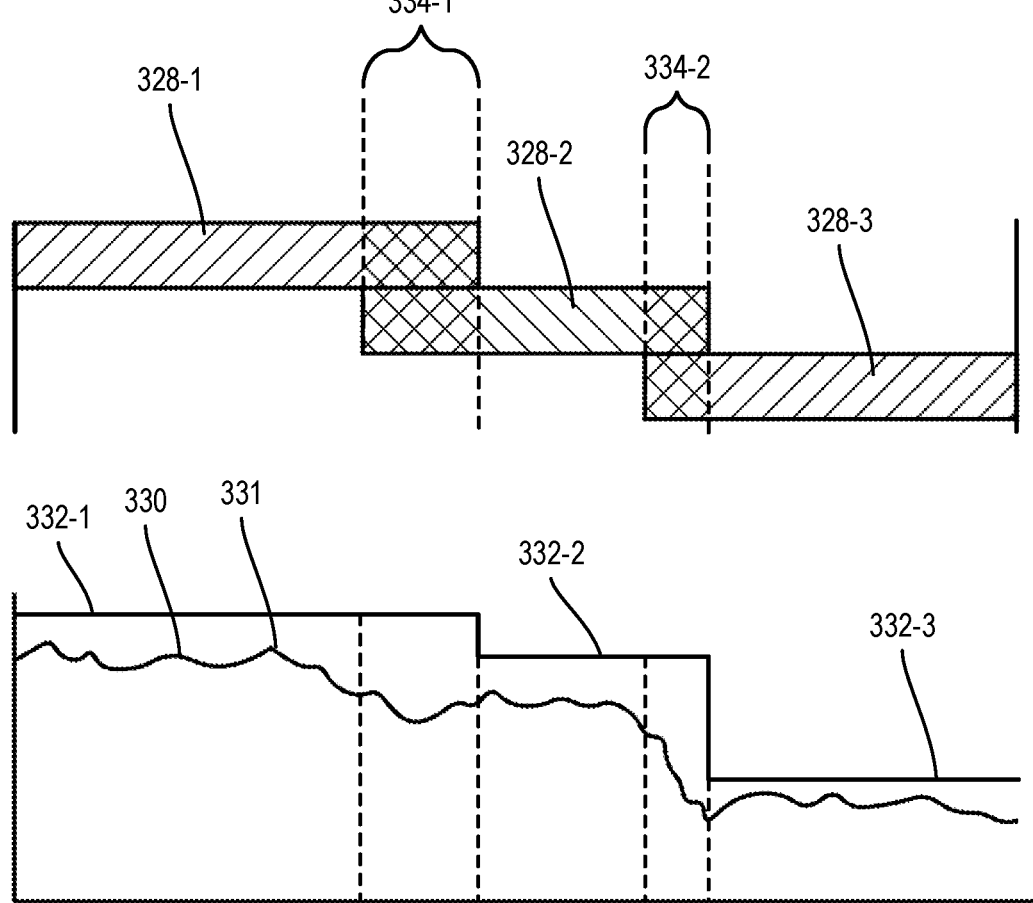
FIG. 3 is a timeline illustrating transitions between energy storage systems in a datacenter, according to at least some embodiments of the present disclosure.

FIG. 3 illustrates an embodiment of a discharge plan on a timeline relative to the datacenter power demand. In some embodiments, the discharge plan begins at T=0 when a voltage drop or other power failure from the regional grid is detected. The hierarchical ESS controller instructs the first ESS to discharge according to a first discharge schedule 328-1 based at least partially on a datacenter power demand 330 at the time. In some embodiments, the first discharge schedule 328-1 provides additional power capacity above the instantaneous datacenter power demand 330 to accommodate variations 331 in the datacenter power demand 330.

In some embodiments, as the first ESS depletes, the hierarchical ESS controller instructs the second ESS to begin discharging according to a second ESS schedule 328-2 that partially overlaps with the first ESS schedule 328-1 to maintain a first power capacity 332-1 during a first transition period 334-1. In some examples, the second ESS and/or the second ESS schedule 328-2 has a second power capacity 332-2 that is less than the first power capacity 332-1. In some embodiments, the hierarchical ESS controller determines a ratio of the power outputs from the first ESS and the second ESS during the transition period. In some examples, the ratio is constant through at least a portion of the transition period. In some examples, the ratio is constant through the entire transition period. In some examples, the ratio changes during the transition period. For example, the ratio of power from the first ESS relative to the power from the second ESS may decrease during the transition period.

In such examples, the hierarchical ESS controller communicates with the allocator, rack manager, row manager, and/or the IT load directly to reduce the datacenter power demand based at least partially on the second power capacity 332-2 during the first transition period 334-1 and/or before the first ESS schedule 328-1 ends. In some embodiments, reducing the datacenter power demand includes migrating workload and/or power capping the IT load. The second ESS schedule 328-2 provides electrical power to the IT load up to the second power capacity 332-2 for a duration of time until a second transition period 334-2 where a third ESS schedule 328-3 instructs a third ESS to provide power.

After the second transition period 334-2, the third ESS schedule 328-3 provides electrical power at a third power capacity 332-3 that may be different from the first power capacity 332-1 and/or the second power capacity 332-2. In such examples, the hierarchical ESS controller communicates with the allocator, rack manager, row manager, and/or the IT load directly to adjust the datacenter power demand based at least partially on the third power capacity 332-3 during the first transition period 334-1 and/or before the first ESS schedule 328-1 ends.

FIG. 4 is a flowchart illustrating a method 436 of managing electrical power in a datacenter with power demand management via the allocator, rack manager, row manager, and/or the IT load directly. In some embodiments, the method 436 includes obtaining grid information from a regional power grid at 418. In some embodiments, the grid information includes grid pricing information, grid power supply information, grid carbon load information, or other types of grid information. The hierarchical ESS controller may obtain the grid information from the grid information source. In some embodiments, a grid information source is part of a grid connection. In some embodiments, the grid information source is accessed by the energy controller by a network or other connection method.

The method 436 further includes obtaining first ESS state information at 420 and obtaining second ESS state information at 422. In some embodiments, the ESS state information includes a SOC, SOH, available energy capacity, available power capacity, startup duration, and other properties or status information of the ESS. A SOC or SOH of the ESS may be obtained from the ESS or from fuel or energy storage elements of the ESS. For example, the ESS may have a SOC or SOH for the ESS or individual fuel or energy storage elements of the ESS, such as battery cells or fuel elements. In some embodiments, the ESS state information includes a total energy capacity of the ESS and an available energy capacity, such as for a liquid fuel generator. The available energy capacity indicates the energy currently available in the ESS for discharge to the IT load, while the total energy capacity may indicate the potential for greater energy capacity if and when the ESS is refueled.

In some embodiments, the ESS is continuously refuellable, such as a combustion generator, or continuously rechargeable, such as a Li-ion battery. In some examples, a continuously refuellable ESS is continuously refuellable by fuel being added to a fuel tank in any amount (up to the capacity of the fuel tank) at any time. In some examples, the continuously refuellable or continuously rechargeable ESS may be refuellable whether the continuously refuellable ESS is operating or not. This may allow a continuously refuellable or continuously rechargeable ESS to be refueled during operation and continue producing power during refueling. In other examples, a coal combustion energy source or hydrogen fuel cell may be continuously refueled with any amount of fuel at any time. A continuously refuellable or continuously rechargeable module or generator of an ESS is able to operate and produce electrical power substantially continuously, including through refueling or recharging. The total energy capacity of a continuously refuellable or continuously rechargeable ESS may allow the hierarchical ESS controller to determine whether to discharge the continuously refuellable or continuously rechargeable ESS and/or when to refuel the continuously refuellable ESS.

In some embodiments, the ESS state information includes one or more of a minimum power capacity, a maximum power capacity, and an available power capacity of the ESS. For example, an ESS may have different power capacities at different SOC or SOH of the ESS or fuel elements therein. For example, a lithium-ion battery cell has a greater power capacity at a higher SOC than at a lower SOC. The hierarchical ESS controller may require an ESS to provide a minimum power capacity to sustain the IT load. In another example, the ESS may have a maximum power capacity that is possible under certain conditions, such as for a limited period of time or under certain temperature conditions. The hierarchical ESS controller may consider the maximum power capacity of the ESS when determining a discharge plan. In some examples, an ESS has an available power capacity that, based upon a SOC, temperature, or other condition of the ESS, is less than a maximum power capacity. The hierarchical ESS controller may consider the available power capacity of the ESS when determining a discharge plan.

In some embodiments, the method 436 further includes obtaining datacenter power demands at 424. Obtaining datacenter power demands includes obtaining IT telemetry and/or workload information. For example, the IT telemetry may be obtained by the hierarchical ESS controller from a rack manager, a row manager, the allocator, or from the server computers or other equipment of the IT load. In some examples, IT telemetry includes power draw, processing utilization (e.g., as a percentage of available processing resources), memory utilization (e.g., as a percentage of available memory resources), and other real-time or historical data regarding the operation of the IT load. In some examples, obtaining the workload includes communicating with the allocator and/or the IT load. The workload includes assigned processes and/or VMs that perform requested operations.

In some embodiments, obtaining the datacenter power demands includes obtaining datacenter energy demands. For example, while the ESSs are controlled by the hierarchical ESS controller to provide electrical power to continue operations of the IT load, the hierarchical ESS controller may plan or schedule discharges from a plurality of ESSs to ensure a sufficient amount of electrical energy is available to complete the current workload.

For example, the method 436 may include obtaining a current electrical power draw of the IT load to determine the power demand that allows the IT load to continue operating at the current level. In another example, the method 436 may include measuring a trend of IT telemetry to predict a future power demand or energy demand to continue or complete the current workload.

The method 436 further includes determining a discharge schedule of the first ESS and the second ESS for the datacenter based at least partially on the grid information and the datacenter power demands at 426. In some embodiments, determining a discharge schedule includes determining a discharge time, discharge rate, and discharge duration for an ESS.

The method 436 further includes discharging at least one of the first ESS and the second ESS based on the discharge schedule at 427 as described herein. In some embodiments, the method 436 includes transmitting the discharge schedule to an allocator at 438 and the discharge schedule includes a power capacity of the first ESS and the second ESS. The allocator, whether incorporated in a rack manager, row manager, or a standalone controller, may provide instructions to the IT load to reduce the power draw of the IT load.

The method 436 further includes reducing the datacenter power demand below the power capacity of the first ESS and the second ESS based at least partially on the discharge schedule at 440. For example, the allocator may migrate workload from the IT load to another server rack, another server row, another datacenter, or other IT equipment to decrease the datacenter power demand. In some instances, the allocator power caps the IT load such that the power draw of the IT load is reduced for the same workload. In such examples, the energy requirement to complete the workload may be the same or even increase, as the lower power draw causes the IT load to take more time to complete the assigned workload. In some embodiments, reducing the datacenter power demand below the power capacity of the first ESS and the second ESS includes a combination of power capping the IT load and migrating at least a portion of the workload to other IT equipment.

Figure 5:
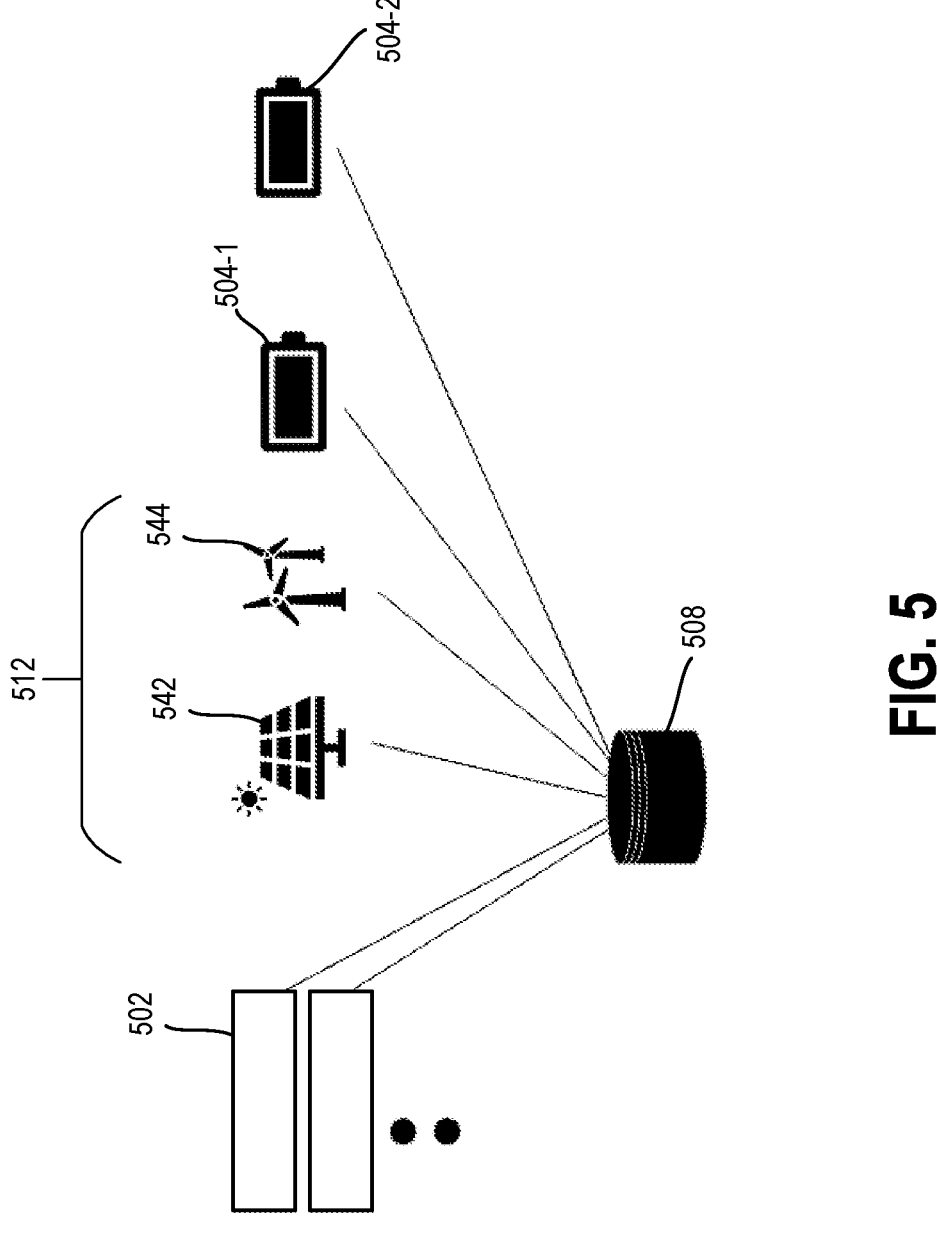
FIG. 5 is a schematic illustration of a variable power grid and energy storage systems providing electricity to a datacenter, according to at least some embodiments of the present disclosure.

In some embodiments, systems and methods described herein include a hierarchical ESS controller that communicates with a plurality of ESSs to reduce electrical energy costs and/or carbon load by selectively charging and discharging the plurality of ESSs based on grid information including grid pricing information and/or grid source information or grid carbon load information. FIG. 5 is a schematic representation of a hierarchical ESS controller 508 in communication with a regional power grid 512 and a plurality of ESSs 504-1, 504-2. In some embodiments, the regional power grid 512 receives electricity from a variety of power sources. In some embodiments, the power sources are renewable energy (RE) power sources such as a solar power source 542 and a wind power source 544 that with a lower carbon load but are more intermittent than a combustion power source 546 that generates electricity from carbon fuels, such as a coal. Similarly, grid pricing information may change with day of the week, time of day, and energy source.

In some embodiments, the hierarchical ESS controller 508 obtains grid information from the regional power grid 512 to determine the price of electricity from the regional power grid 512 and/or determine a current carbon load of the electricity from the regional power grid 512 based on the energy source(s) supplying to the regional power grid 512. In some examples, the hierarchical ESS controller 508 may discharge the ESSs 504-1, 504-2 to the IT load 502 during periods of high carbon load and/or high grid pricing from the regional power grid 512. In some examples, the hierarchical ESS controller 508 may discharge the ESSs 504-1, 504-2 to the IT load 502 during periods of high carbon load and/or high grid pricing from the regional power grid 512.

Additionally, the intermittent nature of the RE power sources (e.g., solar power source 542, wind power source 544) can provide fluctuations in the power supply of the regional power grid 512. In some embodiments, the hierarchical ESS controller 508 obtains grid information from the regional power grid 512 to determine the power supply of the regional power grid 512, and the hierarchical ESS controller 508 determines a charging plan and/or charging schedule to charge one or more of the ESSs 504-1, 504-2 from the regional power grid 512 during periods of surplus supply, low carbon load, low grid pricing, and other desirable grid conditions. For example, the hierarchical ESS controller 508 may determine a charging plan and discharge plan that discharges the ESSs 504-1, 504-2 during periods of low electricity production from RE sources associated with low carbon loads and charges the ESSs 504-1, 504-2 during periods of high electricity production from RE sources associated with low carbon loads.

Figure 6:
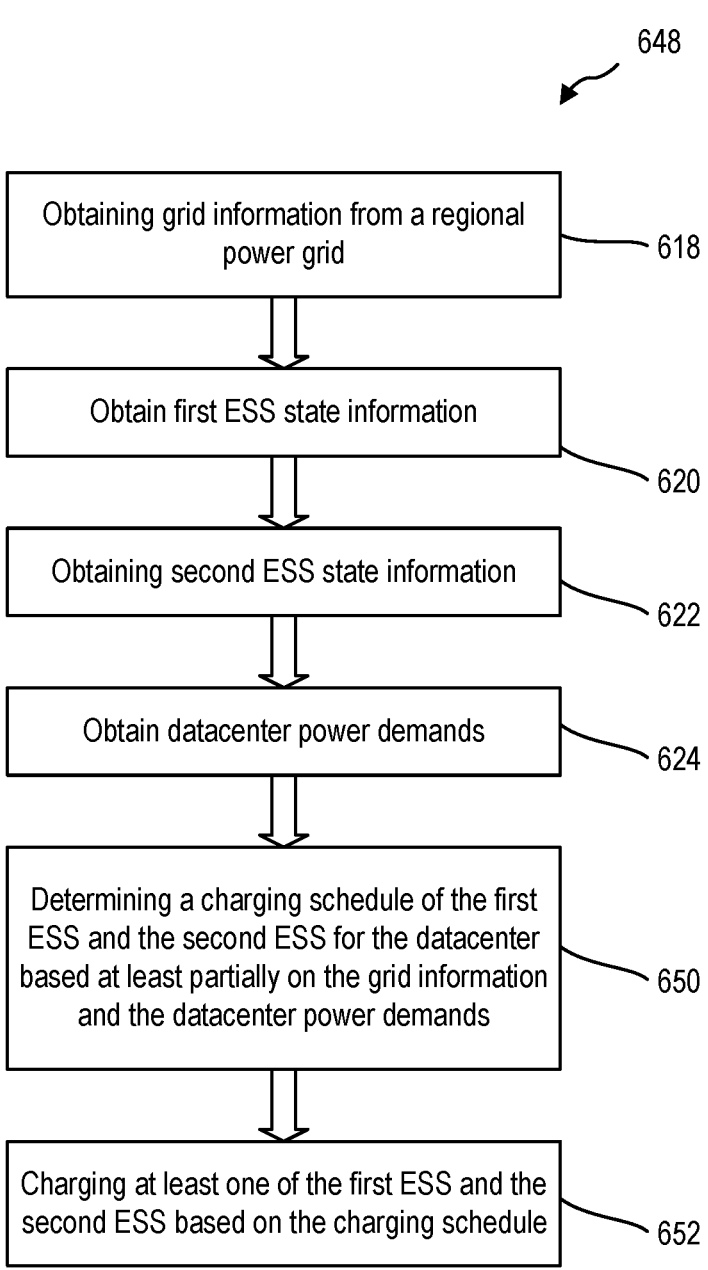
FIG. 6 is a flowchart illustrating a method of charging an energy storage system for a datacenter, according to at least some embodiments of the present disclosure.

FIG. 6 is a flowchart illustrating an embodiment of a method 648 of charging an ESS based at least partially on grid information. In some embodiments, the method 648 includes obtaining grid information from a regional power grid at 618. In some embodiments, the grid information includes grid pricing information, grid power supply information, grid carbon load information, or other types of grid information. The hierarchical ESS controller may obtain the grid information from the grid information source. In some embodiments, a grid information source is part of a grid connection. In some embodiments, the grid information source is accessed by the energy controller by a network or other connection method.

The method 648 further includes obtaining first ESS state information at 620 and obtaining second ESS state information at 622. In some embodiments, the ESS state information includes a SOC, SOH, available energy capacity, available power capacity, startup duration, and other properties or status information of the ESS. A SOC or SOH of the ESS may be obtained from the ESS or from fuel or energy storage elements of the ESS. For example, the ESS may have a SOC or SOH for the ESS or individual fuel or energy storage elements of the ESS, such as battery cells or fuel elements. The available energy capacity indicates the energy currently available in the ESS for discharge to the IT load, while the total energy capacity may indicate the available capacity for charging of the ESS.

In some embodiments, the method 648 further includes obtaining datacenter power demands at 624. Obtaining datacenter power demands includes obtaining IT telemetry and/or workload information. For example, the IT telemetry may be obtained by the hierarchical ESS controller from a rack manager, a row manager, the allocator, or from the server computers or other equipment of the IT load. In some examples, IT telemetry includes power draw, processing utilization (e.g., as a percentage of available processing resources), memory utilization (e.g., as a percentage of available memory resources), and other real-time or historical data regarding the operation of the IT load. In some examples, obtaining the workload includes communicating with the allocator and/or the IT load. The workload includes assigned processes and/or VMs that perform requested operations.

In some embodiments, obtaining the datacenter power demands includes obtaining datacenter energy demands. For example, while the ESSs are controlled by the hierarchical ESS controller to provide electrical power to continue operations of the IT load, the hierarchical ESS controller may plan or schedule discharges from a plurality of ESSs to ensure a sufficient amount of electrical energy is available to complete the current workload.

For example, the method 648 may include obtaining a current electrical power draw of the IT load to determine the power demand that allows the IT load to continue operating at the current level. In another example, the method 648 may include measuring a trend of IT telemetry to predict a future power demand or energy demand to continue or complete the current workload.

The method 648 further includes determining a charging schedule of the first ESS and/or the second ESS for the datacenter based at least partially on the grid information and the datacenter power demands at 650. In some embodiments, determining a charging schedule includes determining a charging time, charging rate, and charging duration for an ESS. For example, the charging schedule may be based at least partially on reducing carbon load of the datacenter. In some examples, the charging schedule may be based at least partially on reducing electricity costs from the power grid.

The method 648 further includes charging at least one of the first ESS and the second ESS based on the discharge schedule at 652. In at least one embodiment, charging the first ESS includes discharging a electrical energy from the second ESS to charge the first ESS. For example, the first ESS may have a maximum discharge rate, a faster response time, or other desirable properties relative to the second ESS. Discharging the second ESS to charge the first ESS may allow the first ESS to remain at a higher SOC for a longer period of time, while the second ESS may be charged at a later time when grid conditions are more desirable. For example, the first ESS may include a lithium-ion battery, while the second ESS includes a gravity-based generator which requires a longer startup time. The gravity-based generator (such as pumped hydro) may be discharged to provide electrical power to the lithium-ion batteries during periods of undesirable grid conditions and recharged during periods of desirable grid conditions while the lithium-ion batteries remain at a high SOC, which further allows for a higher maximum energy capacity and/or a higher maximum power capacity of the lithium-ion batteries and reduces degradation by limiting cycling of the lithium-ion batteries SOC. In some embodiments, the second ESS and first ESS discharge simultaneously with the second ESS providing electrical power to charge the first ESS while the first ESS provides electrical power to the IT load. For example, during periods of variable datacenter power demand, the first ESS may response more quickly while the second ESS may produce power more efficiently under a constant load (e.g., charging load to the first ESS).

In at least some embodiments of the present disclosure, a hierarchical ESS controller coordinates the discharge and charge of a plurality of ESSs to allow each ESS to store and supply electricity efficiently. The hierarchical ESS controller can adapt the charging and discharging of the ESSs based on datacenter power demands, properties of the ESSs, and grid information to increase uptime, lower costs, reduce carbon load, provide electricity to the regional power grid, and combinations thereof.

In some embodiments, an ESS is unavailable for discharge in a hierarchical ESS system. For example, a second ESS may be discharged from a previous event and not yet recharged or refueled. In such an example, a hierarchical ESS controller may request or allocate electrical energy from another ESS in the datacenter and/or an ESS pool to provide electricity to a co-location within the datacenter.

Figure 7:
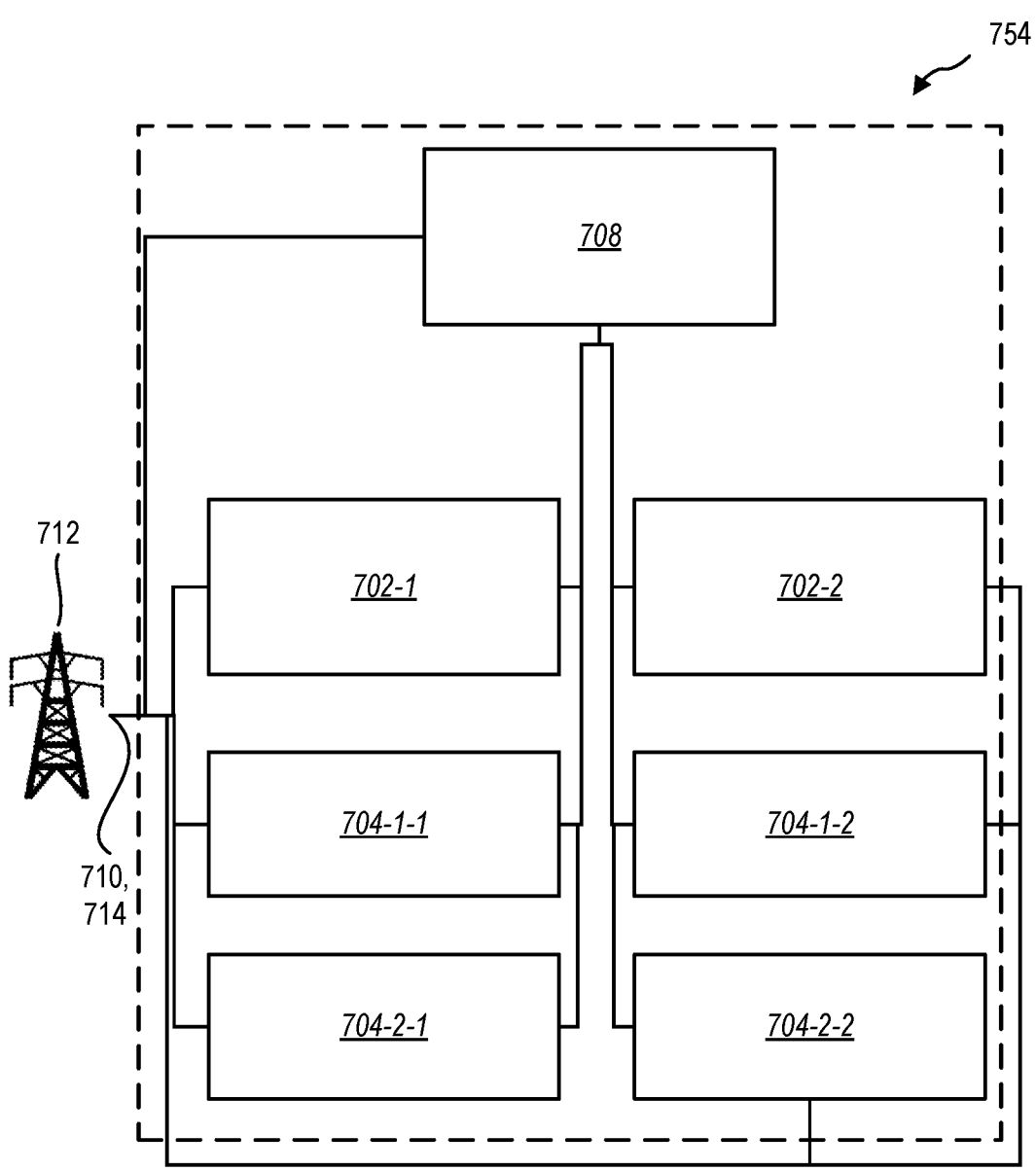
FIG. 7 is a schematic illustration of another system for managing electricity in a datacenter, according to at least some embodiments of the present disclosure.

FIG. 7 schematically illustrates a datacenter 754 including a plurality of co-located IT loads 702-1, 702-2 (e.g., server computers and associated electronics) for which a series of ESSs 704-1-1, 704-2-1, 704-1-2, 704-2-2 are providing backup power. Each co-location within the datacenter, in some embodiments, has a first ESS 704-1-1, 704-1-2 and a second ESS 704-2-1, 704-2-2 configured to provide backup power to that co-location. In some embodiments, a hierarchical ESS controller 708 is in data communication with the first ESS 704-1-1, 704-1-2, the second ESS 704-2-1, 704-2-2, a grid information source 714, and the co-location (i.e., IT load 702-1, 702-2) to manage the charging and/or discharging of the first ESS 704-1-1, 704-1-2 and second ESS 704-2-1, 704-2-2 based on the electrical supply and demand of co-location and the regional power grid 712. In some embodiments, a hierarchical ESS controller 708 is in data communication with multiple co-locations and the ESSs associated therewith. The hierarchical ESS controller 708 can communicate with the first ESS 704-1-1 and the second ESS 704-2-1 of the first co-location and the first ESS 704-1-2 and the second ESS 704-2-2 of the second co-location to obtain state information of each of the ESSs and to determine a discharging and/or charging plan.

In some embodiments, the hierarchical ESS controller 708 can instruct an ESS (e.g., first ESS 704-1-1, second ESS 704-2-1) of the first co-location to discharge to the second co-location, providing electrical energy to the second co-location. For example, a DC bus may allow the distribution of electricity from the first ESS 704-1-1 and/or second ESS 704-2-1 of the first co-location to one or more of the second co-location (and the IT modules therein), the first ESS 704-1-2 of the second co-location, the second ESS 704-2-2 of the second co-location, or combinations thereof.

In at least one example, the hierarchical ESS controller 708 can instruct the first ESS 704-1-1 of the first co-location to discharge and provide electrical energy to the second co-location. In another example, the hierarchical ESS controller 708 can instruct the first ESS 704-1-1 of the first co-location to discharge and provide electrical energy to charge the first ESS 704-1-2 of the second co-location. In yet another example, the hierarchical ESS controller 708 can instruct the first ESS 704-1-1 of the first co-location to discharge and provide electrical energy to charge the second ESS 704-2-2 of the second co-location.

In at least one example, the hierarchical ESS controller 708 can instruct the second ESS 704-2-1 of the first co-location to discharge and provide electrical energy to the second co-location. In another example, the hierarchical ESS controller 708 can instruct the second ESS 704-2-1 of the first co-location to discharge and provide electrical energy to charge the first ESS 704-1-2 of the second co-location. In yet another example, the hierarchical ESS controller 708 can instruct the second ESS 704-2-1 of the first co-location to discharge and provide electrical energy to charge the second ESS 704-2-2 of the second co-location.

For example, a failure of the regional power grid 712 may affect both co-locations and hierarchical ESS systems equally, and the hierarchical ESS controller may begin discharge of the first and/or second ESSs of each co-location. In other examples, the failure or reduction of the electrical power into the datacenter may be at the grid connection 710 or other component at or proximate to the datacenter that disproportionately affects one co-location and/or hierarchical ESS system more than another. In another example, a reduction in the electrical power supply from the grid may reduce the supply, but not below the demands of a first co-location. In that example, the power demand of the second co-location may be greater than the supply, and the second co-location requires additional power from the ESSs to continue operation. In such an example, the first ESS and/or second ESS of the first co-location may supplement the backup power of the second co-location.

While the embodiment of a datacenter of FIG. 7 is described as including a single hierarchical ESS controller in data communication with a plurality of co-locations and ESSs thereof, in some embodiments, systems according to the present disclosure include a plurality of hierarchical ESS controllers in data communication with one another to balance power supply and demand across co-locations and hierarchical ESSs within a datacenter.

The present disclosure relates to systems and methods for managing power generation and storage in a datacenter according to at least the examples provided in the sections below:

Section 1. A system for providing power to a datacenter comprising: a first energy storage system (ESS) configured to provide electrical power to a datacenter; a second ESS configured to provide electrical power to the datacenter, wherein the second ESS is a higher-level ESS relative to the first ESS; a hierarchical ESS controller in data communication with the first ESS, the second ESS, and the datacenter and configured to: obtain grid information from a regional power grid, obtain first ESS state information, obtain second ESS state information, obtain datacenter power demands, determine a discharge schedule of the first ESS and the second ESS for the datacenter based at least partially on the grid information and the datacenter power demands, and discharge at least one of the first ESS and the second ESS based on the discharge schedule.

Section 2. The system of section 1, wherein the first ESS is a lithium-ion battery system.

Section 3. The system of section 1 or 2, wherein the second ESS is a metal-air battery system.

Section 4. The system of any preceding section, wherein the hierarchical ESS controller is configured to determine the discharge plan according to a logic-based model.

Section 5. The system of any preceding section, wherein the hierarchical ESS controller is configured to determine the discharge plan according to real-time telemetry from the datacenter.

Section 6. The system of any preceding section, wherein the hierarchical ESS controller is configured to determine the discharge plan according to historical telemetry from the datacenter.

Section 7. The system of any preceding section, further comprising an allocator, and the hierarchical ESS controller is configured to instruct the allocator to migrate workload based at least partially on the discharge schedule.

Section 8. The system of any preceding section, wherein the hierarchical ESS controller is further configured to: determine a charging schedule for at least one of the first ESS and the second ESS, and charge at least one of the first ESS and the second ESS based on the charging schedule.

Section 9. The system of any preceding section, further comprising an allocator, and the hierarchical ESS controller is configured to instruct the allocator to migrate workload based at least partially on the charging schedule.

Section 10. A method of managing power in a datacenter, the method comprising: obtaining grid information from a regional power grid; obtaining first ESS state information; obtaining second ESS state information; obtaining datacenter power demands of the datacenter; determining a discharge schedule of the first ESS and the second ESS for the datacenter based at least partially on the grid information and the datacenter power demands; discharging the first ESS based on the discharge schedule; and discharging the second ESS based on the discharge schedule.

Section 11. The method of section 10, further comprising: transmitting the discharge schedule to an allocator, wherein the discharge schedule includes a power capacity of the first ESS and the second ESS, and reducing the datacenter power demands below the power capacity of the first ESS and the second ESS based at least partially on the discharge schedule.

Section 12. The method of section 11, wherein reducing the datacenter power demands includes power capping at least one electronic device of the datacenter.

Section 13. The method of section 11, wherein reducing the datacenter power demand includes migrating at least a portion of a workload from the datacenter.

Section 14. The method of any of sections 10 through 13, wherein discharging the second ESS includes charging the first ESS from the second ESS.

Section 15. The method of any of sections 10 through 13, wherein discharging the first ESS and discharging the second ESS include discharging the first ESS and discharging the second ESS simultaneously.

Section 16. The method of any of sections 10 through 15, wherein obtaining datacenter power demands of the datacenter includes predicting datacenter power demands based at least partially on historical datacenter power demands.

Section 17. A method of managing power in a datacenter, the method comprising: obtaining grid information from a regional power grid; obtaining first ESS state information; obtaining second ESS state information; obtaining datacenter power demands of the datacenter; determining a discharge schedule of the first ESS and the second ESS for the datacenter based at least partially on the grid information and the datacenter power demands, wherein the grid information includes grid pricing, and the discharge schedule is based at least partially on the grid pricing; discharging the first ESS based on the discharge schedule; and discharging the second ESS based on the discharge schedule.

Section 18. The method of section 17, further comprising determining a charging schedule of the first ESS and the second ESS for the datacenter based at least partially on the grid information and the datacenter power demands.

Section 19. The method of sections 17 or 18, wherein the grid information includes grid sources, and the discharge schedule is based at least partially on the grid sources.

Section 20. The method of any of sections 17 through 19, wherein the grid information includes carbon load, and the discharge schedule is based at least partially on the carbon load.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" sections are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for providing power to a datacenter comprising:
   a first energy storage system (ESS) configured to provide electrical power to a datacenter, the first ESS being continuously rechargeable;
   a second ESS configured to provide electrical power to the datacenter and to the first ESS, wherein the second ESS is a higher-level ESS relative to the first ESS, and the second ESS being discretely refuellable;
   a hierarchical ESS controller in data communication with the first ESS, the second ESS, and the datacenter and configured to:
      obtain grid information from a regional power grid, wherein the regional power grid does not include the first ESS and does not include the second ESS,
      obtain first ESS state information,
      obtain second ESS state information,
      obtain datacenter power demands,
      determine a discharge schedule of the first ESS and the second ESS for the datacenter based at least partially on the grid information and the datacenter power demands, and
      discharge at least one of the first ESS and the second ESS based on the discharge schedule.

2. The system of claim 1, wherein the first ESS is a lithium-ion battery system.

3. The system of claim 1, wherein the second ESS is a metal-air battery system.

4. The system of claim 1, wherein the hierarchical ESS controller is configured to determine the discharge plan according to a logic-based model.

5. The system of claim 1, wherein the hierarchical ESS controller is configured to determine the discharge plan according to real-time telemetry from the datacenter.

6. The system of claim 1, wherein the hierarchical ESS controller is configured to determine the discharge plan according to historical telemetry from the datacenter.

7. The system of claim 1, further comprising an allocator, and the hierarchical ESS controller is configured to instruct the allocator to migrate workload based at least partially on the discharge schedule.

8. The system of claim 1, wherein the hierarchical ESS controller is further configured to:
   determine a charging schedule for at least one of the first ESS and the second ESS, and
   charge at least one of the first ESS and the second ESS based on the charging schedule.

9. The system of claim 1, further comprising an allocator, and the hierarchical ESS controller is configured to instruct the allocator to migrate workload based at least partially on the charging schedule.

10. A method of managing power in a datacenter, the method comprising:
   obtaining grid information from a regional power grid, wherein the regional power grid does not include a first ESS and does not include a second ESS;
   obtaining first ESS state information of the first ESS, the first ESS being continuously rechargeable;
   obtaining second ESS state information of the second ESS, the second ESS being discretely refuellable;
   obtaining datacenter power demands of the datacenter;
   determining a discharge schedule of the first ESS and the second ESS for the datacenter based at least partially on the grid information and the datacenter power demands;
   discharging the first ESS based on the discharge schedule; and
   discharging the second ESS based on the discharge schedule to charge the first ESS.

11. The method of claim 10, further comprising:
   transmitting the discharge schedule to an allocator, wherein the discharge schedule includes a power capacity of the first ESS and the second ESS, and
   reducing the datacenter power demands below the power capacity of the first ESS and the second ESS based at least partially on the discharge schedule.

12. The method of claim 11, wherein reducing the datacenter power demands includes power capping at least one electronic device of the datacenter.

13. The method of claim 11, wherein reducing the datacenter power demand includes migrating at least a portion of a workload from the datacenter.

14. The method of claim 10, wherein discharging the first ESS and discharging the second ESS include discharging the first ESS and discharging the second ESS simultaneously.

15. The method of claim 10, wherein obtaining datacenter power demands of the datacenter includes predicting datacenter power demands based at least partially on historical datacenter power demands.

16. A method of managing power in a datacenter, the method comprising:
   obtaining grid information from a regional power grid, wherein the regional power grid does not include a first ESS and does not include a second ESS;
   obtaining first ESS state information of the first ESS, the first ESS being continuously rechargeable;
   obtaining second ESS state information of the second ESS, the second ESS being discretely refuellable;

obtaining datacenter power demands of the datacenter;

determining a discharge schedule of the first ESS and the second ESS for the datacenter based at least partially on the grid information and the datacenter power demands, wherein the grid information includes grid pricing, and the discharge schedule is based at least partially on the grid pricing;

discharging the first ESS based on the discharge schedule; and discharging the second ESS based on the discharge schedule.

17. The method of claim 16, further comprising determining a charging schedule of the first ESS and the second ESS for the datacenter based at least partially on the grid information and the datacenter power demands.

18. The method of claim 16, wherein the grid information includes grid sources, and the discharge schedule is based at least partially on the grid sources.

19. The method of claim 16, wherein the grid information includes carbon load, and the discharge schedule is based at least partially on the carbon load.

\* \* \* \* \*